US012579869B1

US 12,579,869 B1

(12) United States Patent
Fernandes

(10) Patent No.: US 12,579,869 B1
(45) Date of Patent: Mar. 17, 2026

(54) SELF-CHECKOUT BARCODE PREDICTION

(71) Applicant: NCR Voyix Corporation, Atlanta, GA (US)

(72) Inventor: Carl Fernandes, Barebhat (IN)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 19/169,423

(22) Filed: Apr. 3, 2025

(51) Int. Cl.
| | |
|---|---|
| *G07G 1/00* | (2006.01) |
| *G06V 10/82* | (2022.01) |
| *G06V 30/224* | (2022.01) |
| *G07G 1/01* | (2006.01) |

(52) U.S. Cl.
CPC ........... *G07G 1/0072* (2013.01); *G06V 10/82* (2022.01); *G06V 30/224* (2022.01); *G07G 1/01* (2013.01); *G06V 2201/10* (2022.01)

(58) Field of Classification Search
CPC ...... G07G 1/01; G07G 1/0045; G07G 1/0054; G07G 1/0063; G07G 1/0072; G06V 10/82; G06V 30/224
See application file for complete search history.

(56) References Cited

U.S. PATENT DOCUMENTS

| | | | |
|---|---|---|---|
| 11,922,268 B1 * | 3/2024 | Lupo | .................... G06K 7/1413 |
| 2021/0264215 A1 * | 8/2021 | Barkan | .................... G06N 3/09 |

\* cited by examiner

*Primary Examiner* — Laura A Gudorf
(74) *Attorney, Agent, or Firm* — Schwegman Lundberg & Woessner, P.A.

(57) ABSTRACT

Methods and system for predicting complete barcodes from damaged or partially unreadable barcodes at self-checkout (SCO) terminals. A hybrid machine learning architecture is utilized that combines sequence processing for partial barcode data with metadata-based prediction using product attributes such as weight and category information. When a damaged barcode is scanned, available data is extracted and combined with contextual information, and the most likely complete or candidate barcode is predicted. The predicted product details are displayed for customer verification, with the customer given options to approve or reject the prediction. The methods and system continuously improve through feedback logging, with incorrect predictions triggering staff intervention when necessary. This minimizes checkout disruptions, reduces manual intervention, and enhances the overall SCO experience for both customers and retailers.

20 Claims, 3 Drawing Sheets

SELF-CHECKOUT BARCODE PREDICTION

BACKGROUND

Self-checkout (SCO) terminals have become increasingly prevalent in retail environments, offering customers convenience and retailers operational efficiency. However, these SCO terminals face a significant challenge when barcodes become damaged or partially unreadable due to various factors during production, printing, processing, logistics, and handling. When a barcode cannot be fully scanned, the SCO process is disrupted, leading to delays and requiring manual intervention from store employees, who must then assist in identifying and processing items, thereby diminishing the overall value proposition of SCO technology and raising operational costs for retailers. This not only causes customer frustration but also reduces the efficiency benefits that SCO terminals provide.

DETAILED DESCRIPTION

Figure 1:
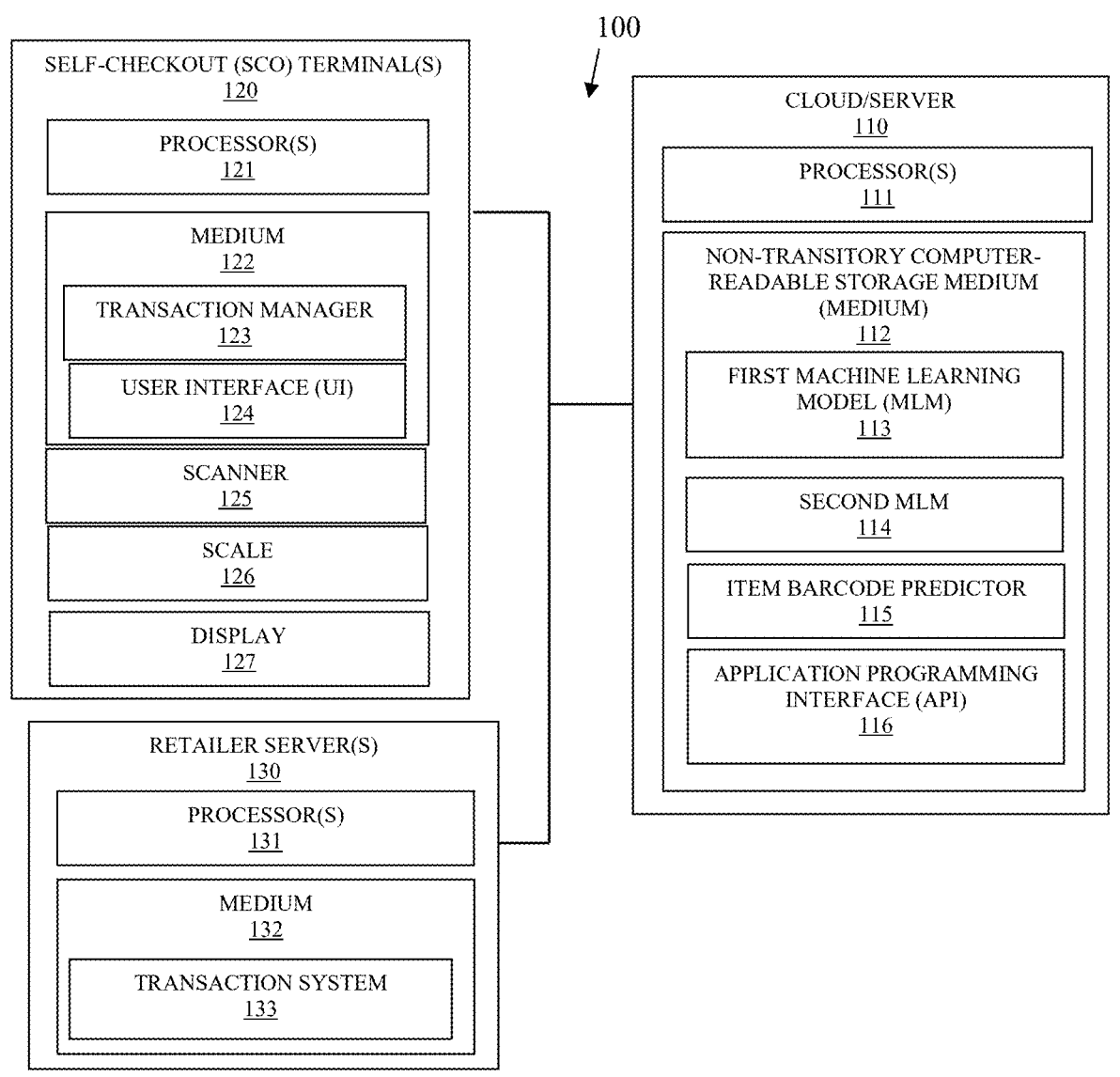
FIG. 1 is a diagram of a system for self-checkout (SCO) barcode prediction, according to an example embodiment.

Self-checkout (SCO) terminals and systems have transformed the retail landscape by offering customers greater autonomy and reducing checkout wait times. These systems rely heavily on barcode scanning technology to identify products accurately and efficiently. However, the effectiveness of these systems is significantly compromised when barcodes become damaged, partially obscured, or otherwise unreadable. Damage to barcodes can occur at various stages of the product lifecycle, including during manufacturing, shipping, stocking, or handling by customers. When a barcode cannot be properly scanned, the SCO process is interrupted, requiring store associate intervention and creating frustration for customers who selected the SCO experience for its speed and convenience.

Barcode scanning failures impact not only the customer experience but retailer operations as well. Store associates must divert their attention away from other tasks to assist with barcode issues, reducing overall operational efficiency. In many cases, items with unreadable barcodes must be processed as generic department sales, which can lead to inventory tracking inaccuracies and potential revenue loss. As SCO adoption continues to grow, the frequency of these disruptions increases proportionally, creating a significant pain point for both retailers and customers that undermines the value proposition of SCO technology.

The technical problem solved by the technology disclosed herein is the inability of current SCO terminals or systems to process and identify products when their barcodes are damaged or partially unreadable. This limitation creates a dependency on manual intervention, disrupting the automated checkout process and negating many of the efficiency benefits that SCO terminals and systems provide. This technical challenge is further exacerbated by the diverse ways in which a barcode can be damaged and the vast array of products with varying characteristics that must be accurately identified during a transaction.

Embodiments of the technology disclosed herein provide technical solutions to the aforementioned technical problems by leveraging machine learning models (MLMs) to combine sequence processing for partial barcode data with metadata-based prediction using product or item attributes. This hybrid architecture employs a recurrent neural network (RNN) MLM to process and predict complete barcodes from partial sequences, while simultaneously utilizing a gradient boosting MLM (GBM) to analyze metadata such as weight and product category. The outputs from both MLMs are combined to generate highly accurate predictions of the complete barcode. The disclosed technology integrates seamlessly with existing SCO infrastructure, presenting predictions to customers for verification and continuously improving MLM predictions through feedback mechanisms.

In an embodiment presented herein, the training data includes various forms of partial barcodes, such as sequences where portions are replaced with placeholder characters (e.g., '1234XXXXXX'), along with normalized weight data and encoded category information. This diverse training dataset enables the MLMs to recognize patterns in damaged barcodes and correlate them with product metadata.

In an embodiment presented herein, the trained MLMs are deployed on SCO terminals using a suitable framework. For complex cases where edge processing is insufficient, the methods and system may utilize cloud-based API services as a fallback mechanism, ensuring prediction capabilities remain available even in challenging scenarios.

In an embodiment presented herein, the methods and system implement a continuous learning process where customer feedback on predictions is logged and used to refine the MLMs. This feedback loop enables the system to adapt to new products, changing inventory, and evolving barcode damage patterns over time.

In an embodiment presented herein, methods and a system employ a comprehensive data ingestion and preparation process. Product data including full barcodes, weights, categories, inventory details, and pricing are collected and stored in a centralized database. This data is augmented with damaged barcode examples and partial barcode sequences to create a robust training dataset. The methods and system normalize weights, encode categories, and generate partial barcode sequences to prepare the data for MLM training.

In an embodiment presented herein, the prediction process begins when a customer scans a damaged or partially readable barcode at the SCO terminal. The methods and system extract the available partial barcode sequence and combine it with contextual information such as the item weight from the SCO scale and product category data. The partial barcode sequence is processed by the RNN MLM, which generates predictions based on sequence patterns. Simultaneously, the metadata is processed by the GBM, which produces predictions based on weight and category correlations. In an example embodiment, these two sets of predictions are then combined using an averaging approach to determine a most likely complete or a candidate barcode.

In an embodiment disclosed herein, an item barcode predictor employs multiple approaches for combining the outputs from the first MLM and the second MLM beyond the averaging approach. These approaches include: (1) a weighted ensemble method where predictions from each MLM are assigned different weights based on confidence scores or historical accuracy for specific product categories; (2) a sequential filtering approach where the output from the first MLM 113 generates a candidate set of barcodes that is then refined by the second MLM 114 based on metadata consistency; (3) a decision tree approach that selects the appropriate combination strategy based on transaction context factors such as time of day, store department, or customer loyalty status; (4) a confidence threshold method where predictions are only accepted when both MLMs exceed predetermined confidence levels, otherwise triggering additional verification steps; and/or (5) a reinforcement learning approach that dynamically adjusts the combination strategy based on feedback from successful and unsuccessful predictions over time. The methods and system may also implement a hybrid approach that selects the optimal combination method based on the specific characteristics of the damaged barcode and available metadata, further improving prediction accuracy across diverse retail environments and product types.

In an embodiment presented herein, the methods and system display the predicted product details on a SCO terminal interface for customer verification. The customer is presented with an acknowledgment option to approve or reject the predicted item. This interaction is logged regardless of the outcome, providing valuable data for continuous MLM refinement and learning. When predictions are incorrect, the methods and system can raise an intervention request for store staff assistance. This feedback loop ensures that the prediction accuracy improves over time, further reducing the need for manual intervention and enhancing the overall SCO experience.

In embodiments, the methods and system address potential ticket switching scenarios where a customer might place a barcode from a low-value item onto a high-value item, particularly when the barcode is partially damaged and triggers the prediction process. When the item barcode predictor generates a potential product identification, the methods and system perform a multi-factor verification process to validate the prediction against other item attributes. This verification includes comparing the predicted product against expected weight ranges measured by the scale of the SCO terminal, utilizing the metadata-based MLM to analyze correlations between the item's characteristics and the predicted barcode, and cross-referencing with inventory data from the retailer's transaction system. If discrepancies are detected—for example, if a predicted low-value product code corresponds to an item whose weight significantly differs from the expected weight range in the database—the methods and system flag this as a potential ticket switching attempt. Upon detecting such conflicting data, the methods and system automatically trigger an intervention request for store staff assistance. The methods and system may display alternative predictions on the UI of the SCO terminal or request customer verification before proceeding with the transaction. T his multi-layered approach leverages both the sequence-based prediction from the first MLM and the metadata-based prediction from the second MLM to ensure that the prediction cannot be exploited for fraudulent purposes, even when processing damaged barcodes.

In an embodiment presented herein, the barcode prediction teachings presented herein minimize disruptions during SCO transactions, decrease the need for employee interventions, and ensure reliable product identification even with damaged barcodes. This makes SCO terminals more robust and user-friendly while positioning retailers as technologically advanced and customer focused.

As used herein, "item" and/or "product" may be used synonymously and interchangeably. This refers to a good with a barcode affixed to it that is being purchased during a SCO transaction at a SCO terminal. As used herein, "user" and/or "customer" may be used synonymously or interchangeably. This refers to an individual engaged in a SCO transaction at a SCO terminal.

Figure 2:
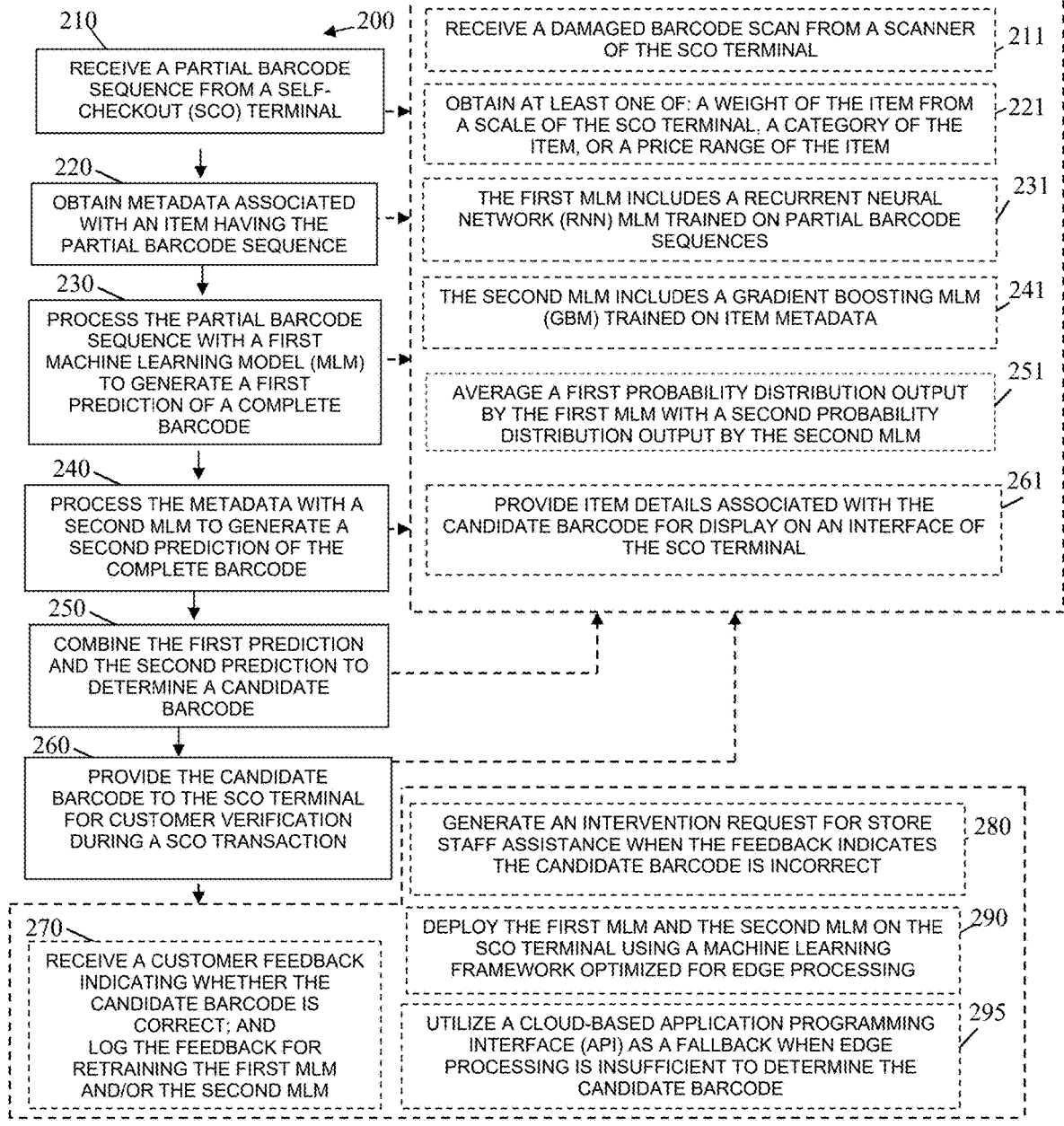
FIG. 2 is a flow diagram of a method for predicting an item barcode during a SCO transaction at a SCO terminal, according to an example embodiment.
Figure 3:
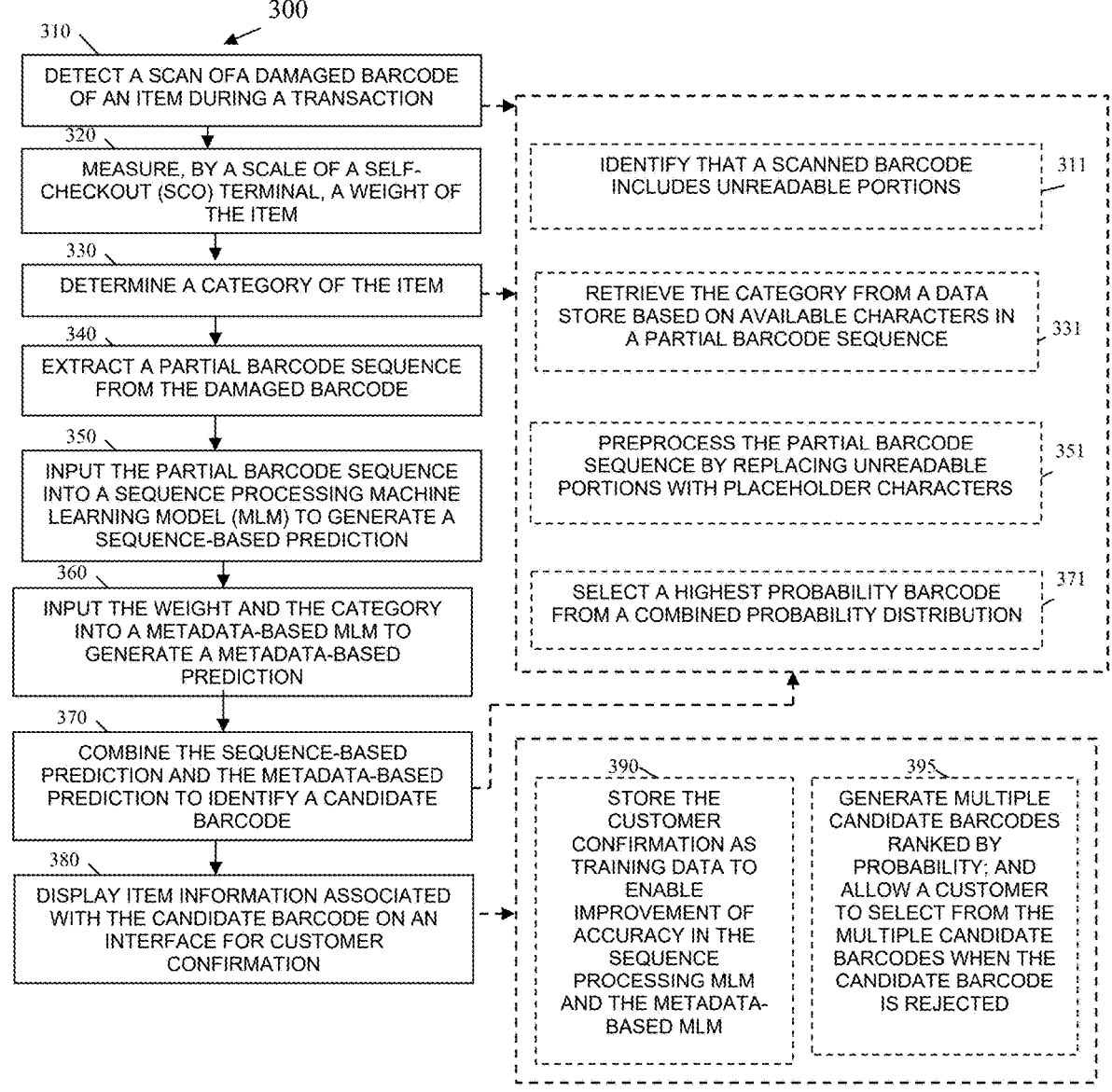
FIG. 3 is a flow diagram of another method for predicting an item barcode during a SCO transaction at a SCO terminal, according to an example embodiment.

The following detailed description of FIGS. 1-3 illustrates the components, data flows, and processes involved in predicting complete barcodes from damaged or partially unreadable ones during SCO transactions. The figures demonstrate how the RNN MLM and GBM work together to generate accurate predictions and how customer feedback is incorporated to continuously improve the predictions of the methods and systems presented herein.

FIG. 1 is a diagram of a system for self-checkout (SCO) barcode prediction, according to an example embodiment. Notably, the components are shown schematically in greatly simplified form, with only those components relevant to understanding of the embodiments being illustrated.

Furthermore, the various components (that are identified in system 100) are illustrated and the arrangement of the components are presented for purposes of illustration only. It is to be noted that other arrangements with more or less components are possible without departing from the teachings for predicting item barcodes during SCO transactions at SCO terminals, presented herein and below.

System 100 includes a cloud 110 or server, one or more SCO terminals 120, and one or more retailer servers 130. Cloud 110 includes at least one processor 111 and a non-transitory computer-readable storage medium 112 (medium), which includes instructions for a first MLM 113, a second MLM 114, an item barcode predictor 115, and an application programming interface (API) 116. The instructions when executed by the processor 111 cause the processor 111 to perform operations discussed herein and below with respect to 113-116.

Each SCO terminal 120 includes at least one processor 121 and a medium 122, which includes instructions for a transaction manager 123 and a user interface (UI) 124. The instructions when executed by the processor 121 cause the processor 121 to perform the operations discussed herein and below with respect to 123-124. Each SCO terminal 120 also includes a scanner 125, a scale 126, and a display 127.

Each retailer server 130 includes at least one processor 131 and medium 132, which includes instructions for a transaction system 133. The instructions when executed by processor 131 cause processor 131 to perform operations discussed herein and below with respect to 133.

In an embodiment, the first MLM 113 is implemented as a recurrent neural network (RNN) MLM that is specifically trained to process partial barcode sequences and predict complete barcodes. During training, the RNN MLM 113 is provided with various forms of partial barcode sequences, such as "12345XXXXX" where portions of complete barcodes are replaced with placeholder characters. This training enables the RNN MLM 113 to recognize patterns in damaged or partially readable barcodes and generate probability distributions for likely complete barcodes.

In an embodiment, the second MLM 114 is implemented as a gradient boosting MLM (GBM) that is trained to analyze item metadata such as weight and category information. During training, the GBM 114 is provided with normalized weight data and encoded category information paired with corresponding complete barcodes. This training enables the GBM 114 to correlate item characteristics with specific products and generate probability distributions for likely complete barcodes based solely on these characteristics.

The item barcode predictor 115 serves as the central coordination component that receives inputs from and provides inputs to both MLMs 113 and 114. During a SCO transaction, the item barcode predictor 115 receives a partial barcode from the transaction manager 123 and passes this as input to the first MLM 113. Similarly, the item barcode predictor 115 receives item weight data from the transaction manager 123 (which was initially captured by the scale 126) and passes this as input to the second MLM 114. The item barcode predictor 115 then combines the outputs from both MLMs using an averaging approach to determine the candidate complete barcode for the item being processed.

The transaction manager 123 manages the overall SCO transaction process through interaction with a corresponding transaction system 133. The transaction manager 123 also communicates with the item barcode predictor 115, via API 116, when a damaged or partially readable barcode is encountered. The scanner 125 captures barcode data from items, while the scale 126 measures item weights. The UI 124 and display 127 provide the interface through which customers interact with the SCO terminal 120 and verify predicted barcodes. The transaction manager 123 controls the states and UI screens presented during a SCO transaction.

The transaction system 133 maintains the retailer's inventory, pricing, and product database, which can be accessed by the item barcode predictor 115, via API 116, to obtain additional metadata about products when needed. During operation of system 100, the item barcode predictor 115 provides the partial barcode to the first MLM 113 and the metadata obtained from the product database to the second MLM 114. Barcode predictions provided by the MLMs (1113, 114) an analyzed and one or more most likely or candidate barcodes are selected and returned to transaction manager 123 for presentation to the user within user UI 124.

A typical user journey through the system 100 begins when a customer scans an item with a damaged barcode at the SCO terminal 120. The scanner 125 attempts to read the barcode but can only capture a partial sequence due to damage or obstruction. The transaction manager 123 recognizes that a complete barcode could not be obtained and forwards the partial barcode sequence to the item barcode predictor 115 via API 116. Simultaneously, the scale 126 measures the weight of the item, which is also forwarded to the item barcode predictor 115 via the transaction manager 123 using API 116.

Once the candidate complete barcode is determined, via analysis of output from the first MLM 113 and the second MLM 114, the item barcode predictor 115 sends this information back to the transaction manager 123, which displays the corresponding product details on the display 127 through the UI 124. The customer is then presented with an option to confirm or reject the predicted item. This feedback is captured through the UI 124 and forwarded back to the item barcode predictor 115, which logs it for future MLM retraining purposes.

If the customer confirms the prediction, the transaction proceeds normally. If the customer rejects the prediction, the system 100 can either present alternative predictions or generate an intervention request for store staff assistance. In either case, the feedback is logged and used to retrain both the first MLM 113 and the second MLM 114, continuously improving their prediction accuracy over time. This retraining process involves periodically updating the MLMs with new feedback data, allowing them to adapt to changing product inventories and evolving patterns of barcode damage.

The API 116 provides a cloud-based fallback mechanism for cases where the edge processing capabilities of the SCO terminal 120 are insufficient to determine the most likely complete or candidate barcode. In such scenarios, the item barcode predictor 115 can utilize the API 116 or an additional API to access additional computational resources or more comprehensive product databases to enhance prediction accuracy.

The item barcode predictor 115 initiates the prediction process by passing the partial barcode sequence to the first MLM 113 and the product or item metadata (e.g., weight, item classification, etc.) to the second MLM 114. The first MLM 113 processes the partial sequence and generates a probability distribution for likely complete barcodes. Concurrently, the second MLM 114 analyzes the metadata and generates its own probability distribution for likely complete barcodes. The item barcode predictor 115 combines these distributions, typically by averaging them, to determine the candidate complete barcode for the item.

In an embodiment, the first MLM 113, the second MLM 114, and the item barcode predictor 115 are hosted on retailer server 130. In an embodiment, the first MLM 113, the second MLM 114, and the item barcode predictor 115 are processed on the SCO terminal 120.

In an embodiment, the first MLM 113 and second MLM 114 are deployed on the SCO terminal 120 using TensorFlow® Lite or similar frameworks optimized for edge processing. This deployment approach enables real-time barcode prediction without requiring constant network connectivity, while still allowing for cloud-based processing via API 116 when needed for more complex predictions.

FIG. 2 is a flow diagram of a method 200 for predicting an item barcode during a SCO transaction at a SCO terminal, according to an example embodiment. The software module(s) that implements the method 200 is referred to as an "item barcode predictor." The item barcode predictor is implemented as executable instructions programmed and residing within memory and/or a non-transitory computer-readable (processor-readable) storage medium and executed by one or more processors of one or more devices. The processor(s) of the device that executes the item barcode predictor are specifically configured and programmed to process the item barcode predictor. The item barcode predictor may have network connectivity including wired, wireless, or a combination of wired and wireless network connectivity.

In an embodiment, the device that executes the item barcode predictor is cloud 110, SCO terminal 120, or retailer server 130. In an embodiment, the item barcode predictor is all or some combination of components 113, 114, 115, and/or 116.

At 210, the item barcode predictor receives a partial barcode sequence for a SCO terminal 120. In an embodiment, at 211, the item barcode predictor receives a damaged barcode scan from a scanner 125 of the SCO terminal 120.

At 220, the item barcode predictor obtains metadata associated with an item having the partial barcode sequence. In an embodiment, at 221, the item barcode predictor obtains at least one of: a weight of the item from a scale 126 of the SCO terminal 120, a category of the item, or a price range of the item.

At 230, the item barcode predictor processes the partial barcode sequence with a first MLM 113 to generate a first prediction of a complete barcode. In an embodiment, at 231, the with the first MLM 113 is a RNN MLM trained on partial barcode sequences to provide predicted barcode sequences.

At 240, the item barcode predictor processes the metadata with a second MLM 114 to generate a second prediction for the complete barcode. In an embodiment, at 241, the second MLM 114 is a GBM trained on item metadata.

At 250, the item barcode predictor combines the first prediction and the second prediction to determine a candidate complete barcode. In an embodiment, at 251, the item barcode predictor averages a first probability distribution output by the first MLM 113 and a second probability distribution outputted by the second MLM 114.

At 260, the item barcode predictor provides the candidate barcode to the SCO terminal 120 for customer verification during a SCO transaction. In an embodiment, at 261, the item barcode predictor provides item details associated with the candidate barcode for display on an interface (e.g., UI 124) of the SCO terminal 120.

In an embodiment, at 270, the item barcode predictor receives a customer feedback indicating whether the candidate barcode is correct. The item barcode predictor logs the customer feedback for retraining of at least one of the first MLM 113 and/or the second MLM 114.

In an embodiment, at 280, the item barcode predictor generates an intervention request for store staff assistance when the customer feedback indicates the candidate barcode is incorrect. In an embodiment, at 290, the item barcode predictor deploys the first MLM 113 and the second MLM 114 on the SCO terminal 120 using a machine learning framework optimized for edge processing. In an embodiment, at 295, the item barcode predictor utilizes a cloud-based API 116 as a fallback when edge processing is insufficient to determine the candidate complete barcode.

FIG. 3 is a flow diagram of another method 300 for predicting an item barcode during a SCO transaction at a SCO terminal, according to an example embodiment. The software module(s) that implements the method 300 is referred to as an "SCO barcode predictor." The SCO barcode predictor is implemented as executable instructions programmed and residing within memory and/or a non-transitory computer-readable (processor-readable) storage medium and executed by one or more processors of a device. The processors that execute the SCO barcode predictor are specifically configured and programmed for processing SCO barcode predictor. The SCO barcode predictor may have network connectivity including wireless, wired, or a combination of wireless and wired connectivity.

In an embodiment, the device that executes the SCO barcode predictor is cloud 110, SCO terminal 120, or retailer server 130. In an embodiment, the SCO barcode predictor is all or some combination of components 113, 114, 115, 116, 123, 124, 133, and/or method 200. The SCO barcode predictor presents another, and in some ways an enhanced processing perspective from that which was described above with method 200 of FIG. 2.

At 310, the SCO barcode predictor detect a scan of a damaged barcode of an item during a transaction. In an embodiment, at 311, the SCO barcode predictor identifies that the scanned barcode includes unreadable portions.

At 320, the SCO barcode predictor measures, via a scale of a SCO terminal 120, a weight of the item. At 330, the SCO barcode predictor determines a category of the item. In an embodiment, at 331, the SCO barcode predictor retrieves the category from a data store based on available characters in a partial barcode sequence.

At 340, the SCO barcode predictor extracts a partial barcode sequence from the damaged barcode. At 350, the SCO barcode predictor inputs the partial barcode sequence into a sequence processing MLM 113 to generate a sequence-based prediction. In an embodiment, at 351, the SCO barcode predictor preprocesses the partial barcode sequence by replacing unreadable portions with placeholder characters.

At 360, the SCO barcode predictor inputs the weight and the category into a metadata-based MLM 114 to generate a metadata-based prediction. At 370, the SCO barcode predictor combines the sequence-based prediction and the metadata-based prediction to identify a candidate barcode for the item. In an embodiment, at 371, the SCO barcode predictor selects a highest probability barcode from a combined probability distribution based on the sequence-based prediction and the metadata-based prediction.

At 380, the SCO barcode predictor displays item information associated with the candidate barcode on an interface (e.g., UI 124) for customer confirmation. In an embodiment, at 390, the SCO barcode predictor stores the customer confirmation as training data to enable improvement of accuracy in the sequence processing MLM 113 and the metadata-based MLM 114.

In an embodiment, at 395, the SCO barcode predictor generates multiple candidate barcodes ranked by probability. The SCO barcode predictor allows a customer to select from the multiple candidate barcodes when the candidate barcode is rejected through a UI 124 of the SCO terminal 120.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

receiving, by a processor, a partial barcode sequence from a self-checkout (SCO) terminal;

obtaining, by the processor, metadata associated with an item having the partial barcode sequence;

processing, by the processor, the partial barcode sequence with a first machine learning model (MLM) to generate a first prediction of a complete barcode;

processing, by the processor, the metadata with a second MLM to generate a second prediction of the complete barcode;

combining, by the processor, the first prediction and the second prediction to determine a candidate barcode; and providing, by the processor, the candidate barcode to the SCO terminal for customer verification during a SCO transaction.

2. The method of claim 1, wherein receiving the partial barcode sequence further comprises receiving a damaged barcode scan from a scanner of the SCO terminal.

3. The method of claim 1, wherein obtaining the metadata further comprises obtaining at least one of: a weight of the item from a scale of the SCO terminal, a category of the item, or a price range of the item.

4. The method of claim 1, wherein the first MLM includes a recurrent neural network (RNN) MLM trained on partial barcode sequences.

5. The method of claim 1, wherein the second MLM includes a gradient boosting MLM (GBM) trained on item metadata.

6. The method of claim 1, wherein combining the first prediction and the second prediction further comprises averaging a first probability distribution output by the first MLM with a second probability distribution output by the second MLM.

7. The method of claim 1, wherein providing the candidate barcode further comprises providing item details associated with the candidate barcode for display on an interface of the SCO terminal.

8. The method of claim 1, further comprising:

receiving, by the processor, a customer feedback indicating whether the candidate barcode is correct; and logging, by the processor, the customer feedback for retraining at least one of the first MLM or the second MLM.

9. The method of claim 8, further comprising:

generating, by the processor, an intervention request for store staff assistance when the customer feedback indicates the candidate barcode is incorrect.

10. The method of claim 1, further comprising:

deploying, by the processor, the first MLM and the second MLM on the SCO terminal using a machine learning framework optimized for edge processing.

11. The method of claim 1, further comprising:

utilizing, by the processor, a cloud-based application programming interface (API) as a fallback when edge processing is insufficient to determine the candidate barcode.

12. A method, comprising:

detecting, by a processor of a self-checkout (SCO) terminal, a scan of a damaged barcode of an item during a transaction;

measuring, by a scale of the SCO terminal, a weight of the item;

determining, by the processor, a category of the item;

extracting, by the processor, a partial barcode sequence from the damaged barcode;

inputting, by the processor, the partial barcode sequence into a sequence processing machine learning model (MLM) to generate a sequence-based prediction;

inputting, by the processor, the weight and the category into a metadata-based MLM to generate a metadata-based prediction;

combining, by the processor, the sequence-based prediction and the metadata-based prediction to identify a candidate barcode; and displaying, by the processor, item information associated with the candidate barcode on an interface for customer confirmation.

13. The method of claim 12, wherein detecting the scan of the damaged barcode further comprises identifying that a scanned barcode includes unreadable portions.

14. The method of claim 12, wherein determining the category of the item further comprises retrieving the category from a data store based on available characters in the partial barcode sequence.

15. The method of claim 12, wherein inputting the partial barcode sequence into the sequence processing MLM further comprises preprocessing the partial barcode sequence by replacing unreadable portions with placeholder characters.

16. The method of claim 12, wherein combining the sequence-based prediction and the metadata-based prediction further comprises selecting a highest probability barcode from a combined probability distribution.

17. The method of claim 12, further comprising:

storing, by the processor, the customer confirmation as training data for improving accuracy of the sequence processing MLM and the metadata-based MLM.

18. The method of claim 12, further comprising:

generating, by the processor, multiple candidate barcodes ranked by probability; and allowing, by the processor, a customer to select from the multiple candidate barcodes when the candidate barcode is rejected.

19. A system, comprising:

a self-checkout (SCO) terminal comprising a scanner, a scale, and a display;

a processor; and a memory, wherein the memory contains instruction that when executed by the processor causes the processor to perform operations comprising:

receiving a partial barcode sequence from the scanner when a complete barcode cannot be scanned;

obtaining a weight measurement from the scale;

processing the partial barcode sequence with a recurrent neural network (RNN) machine learning model (MLM) to generate a first set of barcode predictions;

processing the weight measurement with a gradient boosting MLM (GBM) to generate a second set of barcode predictions;

combining the first set of barcode predictions and the second set of barcode predictions to determine a candidate barcode; and presenting product information associated with the candidate barcode on the display for customer verification.

20. The system of claim 19, wherein the operations further comprise:

receiving a customer feedback through the SCO terminal;

logging the customer feedback; and retraining the RNN MLM and the GBM using logged customer feedback to improve prediction accuracy.

* * * * *